US010504100B2

(12) United States Patent
Herwig (10) Patent No.: US 10,504,100 B2
(45) Date of Patent: Dec. 10, 2019

(54) POINT OF SALE VIRTUAL CUSTOMER SESSION

(75) Inventor: Nathaniel Christopher Herwig, Lawrenceville, GA (US)

(73) Assignee: NCR Corporation, Atlanta, GA (US)

( * ) Notice: Subject to any disclaimer, the term of this patent is extended or adjusted under 35 U.S.C. 154(b) by 1195 days.

(21) Appl. No.: 12/847,435

(22) Filed: Jul. 30, 2010

(65) Prior Publication Data

US 2012/0030003 A1 Feb. 2, 2012

(51) Int. Cl.
G06Q 20/36 (2012.01)
G06Q 20/20 (2012.01)
G06Q 20/32 (2012.01)
G06Q 20/04 (2012.01)
G06Q 30/02 (2012.01)
G07G 1/00 (2006.01)

(52) U.S. Cl.
CPC ......... *G06Q 20/32* (2013.01); *G06Q 20/0453* (2013.01); *G06Q 20/20* (2013.01); *G06Q 20/3278* (2013.01); *G06Q 30/0238* (2013.01); *G07G 1/0036* (2013.01)

(58) Field of Classification Search
CPC ....... G06Q 20/36; G06Q 20/105; G06Q 20/20
USPC ........................................................ 705/41
See application file for complete search history.

(56) References Cited

U.S. PATENT DOCUMENTS 7,748,618 B2 * 7/2010 Vawter .......................... 235/380
2002/0170961 A1 * 11/2002 Dickson et al. .............. 235/383
2005/0131761 A1 * 6/2005 Trika et al. .................... 705/14
2009/0287576 A1 * 11/2009 Suzuki ........................... 705/16

FOREIGN PATENT DOCUMENTS

WO 0137200 A1 5/2001

OTHER PUBLICATIONS

International Search Report for European Patent Application No. EP11171629.6, dated Oct. 7, 2011.

* cited by examiner

*Primary Examiner* — Hai Tran
(74) *Attorney, Agent, or Firm* — Schwegman, Lundberg & Woessner (57) ABSTRACT

A terminal and methods are presented for displaying customer information about a transaction occurring on a point of sale terminal on a customer's portable computing device. Creating a virtual session on the portable computing device permits additional information to be presented to the customer. The invention allows the virtual session to be started and ended without the need for assistance by an operator for the point of sale terminal.

28 Claims, 4 Drawing Sheets

POINT OF SALE VIRTUAL CUSTOMER SESSION

FIELD OF THE INVENTION

The present invention relates generally to Point of Sale (POS) terminals. More particularly, the invention relates to a terminal and methods for generating a virtual customer session where a POS terminal uses a customer's portable computing device to create the session for the purpose of displaying transaction information and otherwise interacting with the POS terminal.

BACKGROUND

A POS terminal is used to process items presented for purchase by a customer. The POS terminal includes a computer and peripherals used to identify each of the items presented for purchase. The computer determines the price for each item and uses one or more peripherals to process a payment once all items have been presented for purchase. An assisted POS terminal is operated by a trained cashier. During a transaction, the cashier processes each item while the customer views transaction information on a customer display. As each item is processes, the customer display provides price information and one or more details about the item, such as quantity, weight, description or sales information. Once all items have been processed, the customer interacts with the cashier and/or a payment peripheral to pay for the items, which ends the transaction when the payment is confirmed.

The POS terminal uses the customer display to provide information to the customer and uses other peripherals to receive input from the customer which may also be displayed on the customer display. Once the transaction is complete, some of the information displayed on the customer display may be printed on a receipt and presented to the customer. However, some of the information on the customer display is lost once the transaction is complete because it is not practical to print the information on a paper receipt. The value of some information is dependent on it surviving past the end of the transaction. Therefore, just placing the information on the customer display is not a viable method of communicating it to the customer. In other cases, some information is not even displayed on the customer display because is has little or no present value and is only useful if it can survive past the end of the transaction.

Therefore, the need exists for an improved way of communicating with the customer.

SUMMARY OF THE INVENTION

Among its several aspects, the present invention recognizes that consumers routinely carry one or more different types of portable computing devices (e.g., a mobile smart phone) and that there are advantages to using these portable computing devices to display and store information related to the consumer and to items being purchased at a point of sale terminal. The portable computing device, being handheld, is easy to transport and provides the ability to display and store information about a transaction that could not easily or reasonable (e.g., because of the amount of information) be printed on a receipt. While the information could be presented on a customer display, the information would be lost at the end of the transaction.

The portable computing device of this invention includes a short range wireless communications feature used to communicate with the point of sale terminal. An enrollment process authenticates the portable computing device and the customer using the device. The enrollment process further installs software on the portable computing device and a unique encrypted token that is later used by point of sale terminals to authenticate the portable computing device by processing the token and comparing it with information retained from the enrollment process. The installed software on the portable computing device communicates wirelessly with software running on the point of sale terminal and creates the virtual session on the portable computing device.

When the portable computing device is brought within communication range of the point of sale terminal and a purchase transaction is initiated with the point of sale terminal, the encrypted token is sent to the point of sale terminal for authentication. If the portable computing device is authenticated by the point of sale terminal, a communications connection is established and the virtual session begins. The virtual session ends when the purchase transaction on the point of sale terminal is completed. Using the portable computing device, the customer can at any time request that customer information about the transaction be transmitted to the display on the portable computing device. Without the aid of an operator of the point of sale terminal, the point of sale terminal will start transmitting transaction information to the portable computing device. The point of sale terminal will send history information from the start of the purchase transaction to the present and will then start sending real-time data for each item presented. The portable computing device will display and store the information. At any time after the portable computing device starts receiving transaction information, the customer can use the portable computing device to request that the transaction information not be sent to the portable computing device and only be displayed on the point of sale terminal. The point of sale terminal will then return all information display functions to the point of sale terminal. In this way, the customer can choose whether to interact with the POS system and cashier in a conventional manner, or choose to establish a virtual POS session on their personal device.

When a customer uses the portable computing device to display and store transaction information, the customer can request, through the portable computing device, that no receipt be printed. In addition, the portable computing device is able to store coupons and communicate the coupons to the point of sale terminal when the portable computing device determines that an item covered by a coupon is identified for purchase by the point of sale terminal and will be included in the present transaction. This operation is performed in real-time as items are scanned or identified by the point of sale terminal or when historical information is received after the display function is transferred to the portable computing device.

A more complete understanding of the present invention, as well as further features and advantages of the invention, will be apparent from the following Detailed Description and the accompanying drawings.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

Figure 1:
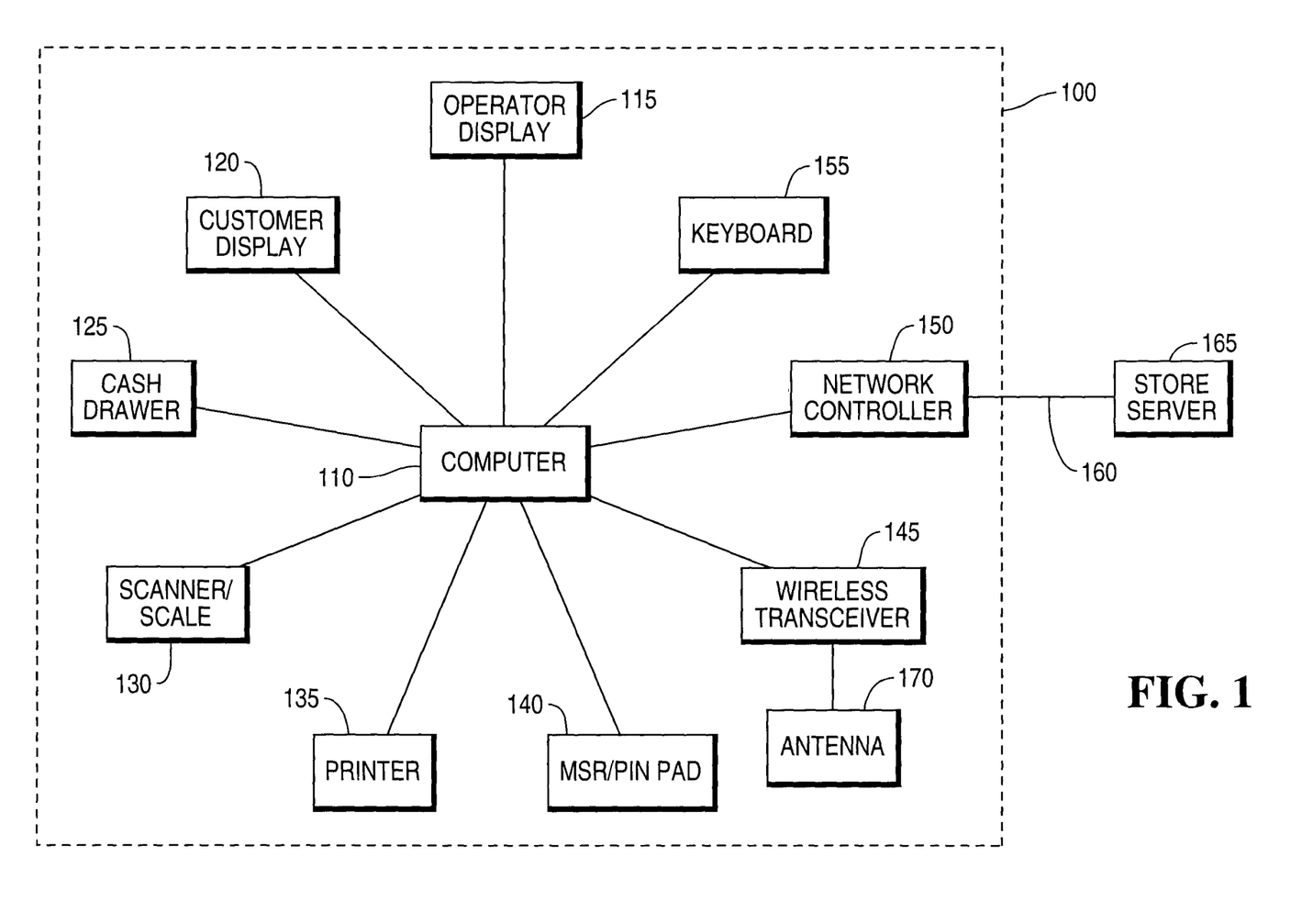
FIG. 1 is a high-level diagram illustrating an exemplar embodiment of a point of sale terminal.

Referring to FIG. 1, there is provided a high-level diagram, in block form, illustrating an exemplar embodiment of a point of sale (POS) terminal 100. The POS terminal 100 is used to process items for purchase that are presented to the terminal 100 by a customer. As each item for purchase is presented to the terminal 100, the terminal 100 identifies the items and determines a price. The terminal 100 maintains a total for all items presented and processes a payment for the items once all items have been presented. A purchase transaction begins when the first item of an order is presented and ends once payment for the items has been completed.

In this embodiment, the POS terminal 100 includes a computer 110 and a number of components and peripherals, as described below. The computer 110 controls the components and peripherals. The POS terminal 100 further includes an operator display 115 that displays information used by a cashier to operate the POS terminal 100. In this embodiment, the cashier is a trained operator employed to, at least in part, operate the POS terminal 100. The terminal 100 includes a keyboard 155 used by the cashier to input data and commands to the computer 110. A cash drawer 125 controlled by the computer 110 is used to store currency and checks. In some embodiments, the cash drawer 125 is an automatic cash acceptor/dispenser which is controlled by the computer 110 and accepts and dispenses currency. A combination scanner and weigh scale 130 is provided. The scanner 130 is used to scan a bar code on items presented for purchase and the weigh scale is used to weigh items sold by weight. The terminal 110 includes a customer display 120. The customer display 120 is visible to the customer and used to display information about the transaction to the customer.

The POS terminal 100 further includes a network controller 150. The network controller 150 has hardware and software necessary for the computer 110 to communicate over a local area network 160 to a store server 165 or other computers and POS terminals on the network 160 or to computers on other networks connected to the local area network 160. The computer 110 also communicates using a wireless transceiver 145 which is connected to an antenna 170 for transmitting and receiving data. The wireless transceiver 145 supports one or more wireless communication standards. WIFI, Bluetooth and standards based on Near Field Communications are examples of the types of communications that are supported. In some embodiments, the wireless transceiver 145 is used to communicate with the store server 165 when the store server 165 includes a wireless transceiver for communications. In these embodiments, the wired network 160 may not be installed or may not be connected to the terminal 100.

The POS terminal 100 includes a magnetic stripe reader (MSR) combined with a PIN Pad 140. The MSR/PIN PAD 140 reads information from a magnetic stripe usually attached to the back of a card, such as a credit/debit card or loyalty card. The PIN pad portion 140 is used to enter PIN numbers (Personal Identification Numbers) associated with a credit or debit card. The MSR/PIN Pad 140 device also has software and hardware to communicate with an external server used to process credit transactions.

The POS terminal 100 includes a printer 135 for printing customer receipts and other information.

The computer 110 includes a processor, a short and long term memory and other logic to control the components and peripherals attached to or part of the computer 110. The computer 110 further includes software applications that are stored in the long term memory and that are executed by the processor to implement the features and functions of the POS terminal 100 by controlling the components and peripherals of the POS terminal 100.

Figure 2:
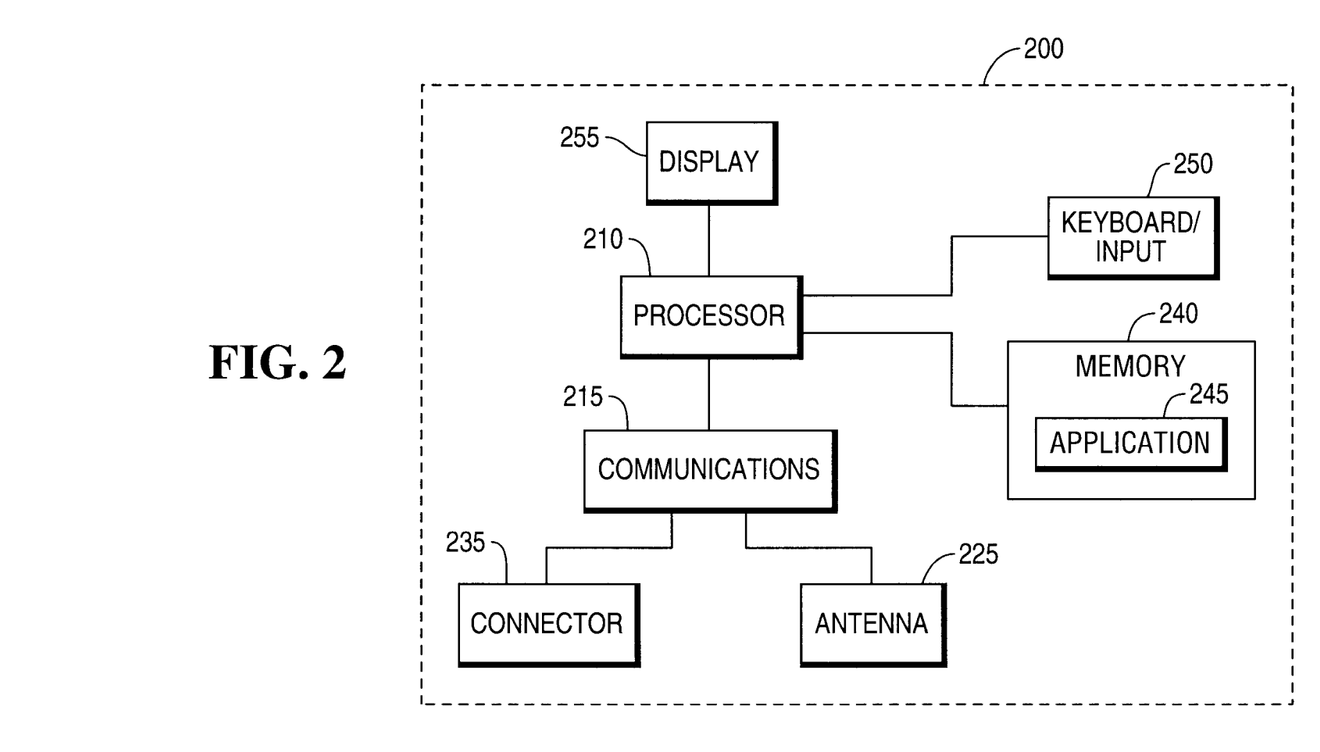
FIG. 2 is a high-level drawing illustrating an exemplar embodiment of a portable computing device.

Turning to FIG. 2, there is provided a high-level diagram, in block form, illustrating an exemplar embodiment of a portable computing device 200. The portable computing device 200 includes a processor 210, a memory 240, a display 255, a keyboard/input device 250 and a communications controller 215. The memory 240 has both short and long term memory storage components. The long term memory is non-volatile and used to store software and data. The software includes applications that are executed by the processor 210 to control the features and functions of the portable computing device 200. The display 255 is used to provide information to a user and has a touch sensor for providing touch information. A keyboard/Input device 250 is used to input data from the user. In some embodiments, the keyboard is a virtual keyboard that is displayed on the display 255. In these embodiments, the user types by touching the display 255. The touch sensor then determines what area of the display 255 was touched and correlates this touch to a "soft key" on the screen. The communications controller 215 communicates wirelessly using an antenna 225 or over a wired network using a connector 235. The communications controller 215 supports one or more wireless networks such as WIFI, Bluetooth, a standard based on Near Field Communications or cell phone networks.

In some embodiments, the portable computing device 200 is a smart phone able to download and execute third party applications. In other embodiments, the portable computing device 200 is a personal digital assistant (PDA) that can also download and execute third party applications. An Apple iPad® is an example of such a PDA. An Apple iPhone® or a Motorola Droid® are examples of the smart phones.

Figure 3:
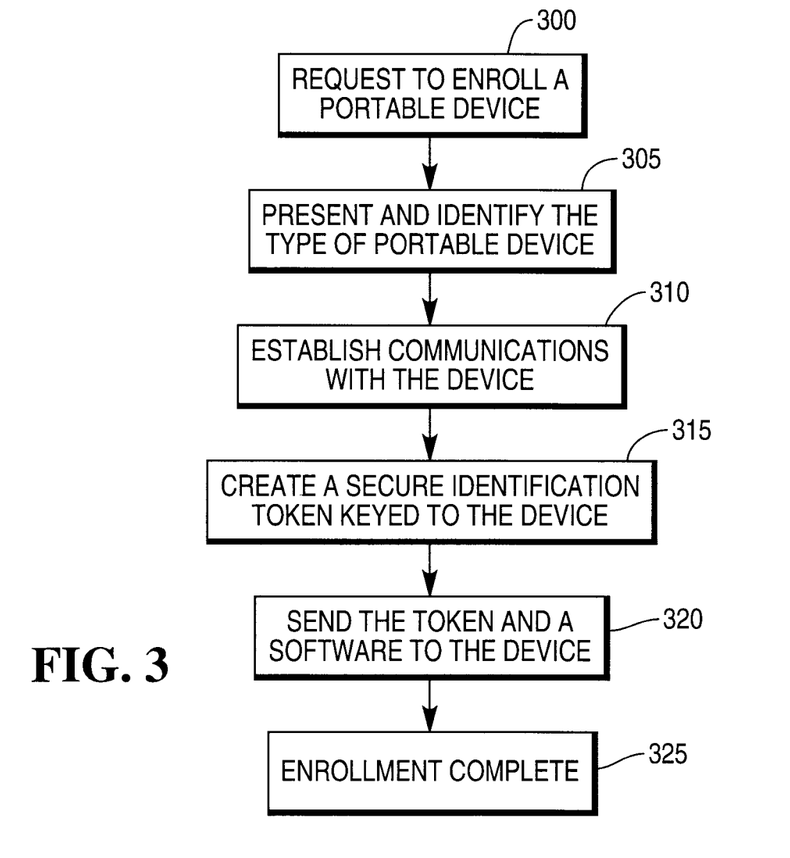
FIG. 3 is a high-level flow chart depicting the operation of enrolling a portable computing device.

Referring now to FIG. 3, there is provided a high-level flow chart depicting the operation of enrolling a portable computing device 200. The POS terminal 100 will only allow a connection to be made to a portable computing device 200 that has been enrolled. A connection is made between two devices after the two devices have exchanged identification information and one or both devices have authenticated the received information. If the authentication fails, the request to create a connection is rejected. In some embodiments, all data communicated over the connection is encrypted to secure the data. In other embodiments, only sensitive data is encrypted prior to being sent over the connection.

There are a number of different methods to enroll a portable computing device 200. In one embodiment, a customer brings their portable computing device 200 to a customer service area of a store. This area has a self-service enrollment terminal that will enroll the device or the customer can ask a clerk to enroll the device 200. In step 300, a request to enroll a portable computing device 200 is made. In step 305, the portable computing device 200 is physically presented and placed in a designated location to allow communications with an enrollment terminal and the type of portable computing device 200 is determined. The type of device maybe entered manually or the enrollment terminal maybe able to determine the type after communications has been established. In step 310, the enrollment terminal establishes communications with the portable computing device 200. For some devices 200, this may involve a pairing function. In establishing communications, the enrollment terminal receives identification information that uniquely identifies the portable computing device 200 and other data from the portable computing device 200. In some embodiments, identification information for a user, or owner, of the portable computing device 200 is provided. In step 315, the enrollment terminal creates a secure identification token that is keyed or specifically tied to the portable computing device 200. This token is encrypted and contains information that identifies the portable computing device 200. In some embodiments, the token also contains information that further identifies the owner of the portable computing device 200. In some embodiments, the token is comprised of several independent tokens and by using public/private keys or an encryption system with similar features, the portable computing device 200 can authenticate a POS terminal that wishes to create a connection with the portable computing device 200. In step 320, the token and one or more software applications are sent to the portable computing device 200. The one or more software applications are installed on the portable computing device 200. In step 325, the enrollment operation ends. In some embodiments, the portable computing device 200 has one or more software applications already install that will support the required interaction with the POS terminal 100. In these embodiments, no additional software is installed.

In other embodiments, the enrollment process is conducted over the Internet by the using a browser running on the portable computing device 200 to connect to a web site that performs the enrollment process. Additional steps such as a one time physical identification check on first use may be required. This step is performed inside a store the first time the portable computing device 200 attempts to connect to a POS terminal 100 after completing the enrollment process.

In still other embodiments, the enrollment process is conducted by a standard POS terminal prior to or after conducting a purchase transaction.

Figure 4:
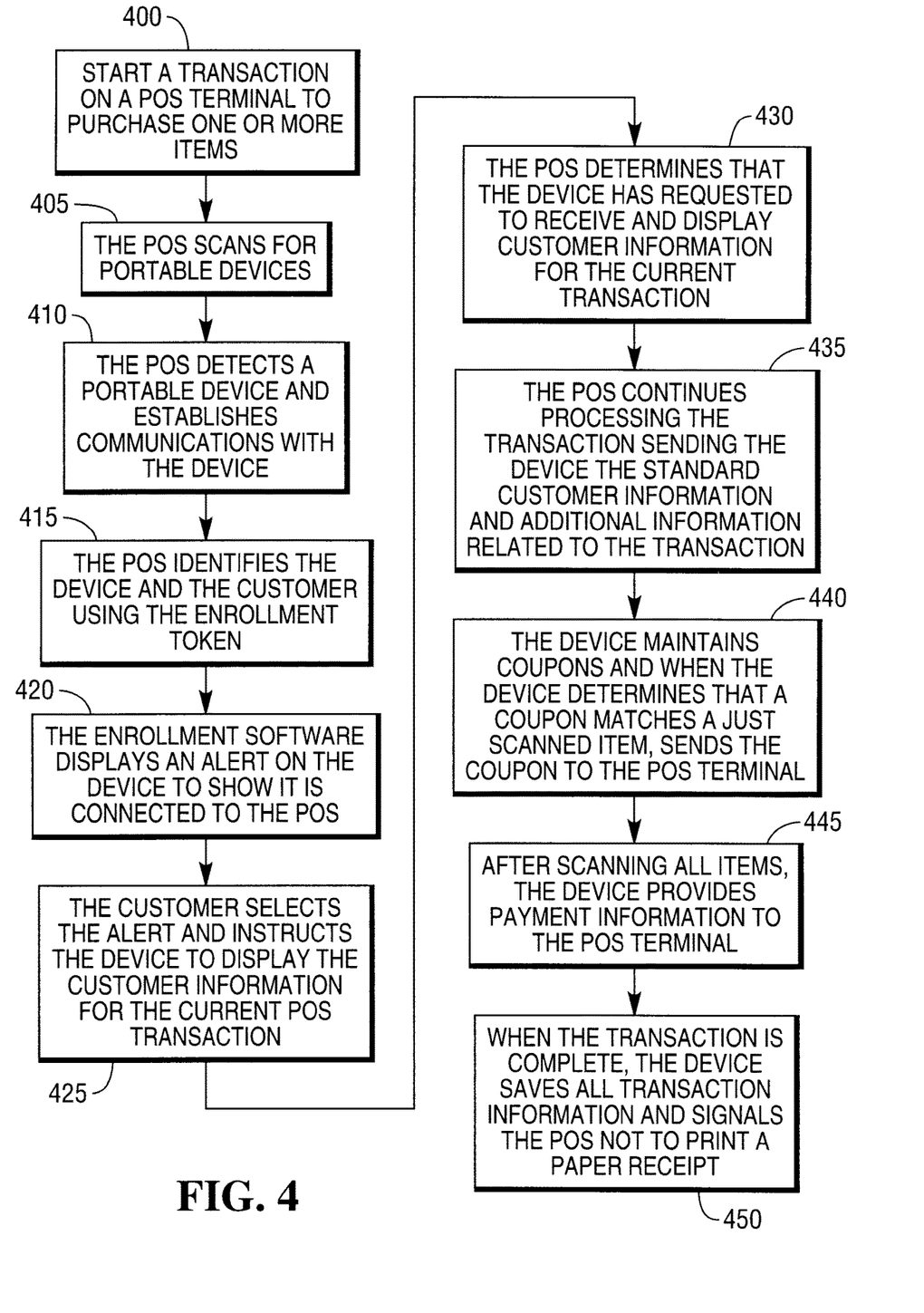
FIG. 4 is a high-level flow chart depicting an interaction between a POS terminal and a portable computing device.

Referring now to FIG. 4, there is provided a high-level flow chart depicting an interaction between a POS terminal 100 and a portable computing device 200. In step 400, a transaction is started on the POS terminal 100 to purchase one or more items physically presented to the POS terminal 100 for purchase by a customer. The customer also being in possession of the portable computing device 200. In step 405, the POS terminal 100 scans wireless communication channels for portable devices. In step 410, the POS terminal 100 detects the portable computing device 200 and establishes initial communication. This level of communication is sufficient to allow the exchange of information necessary for authentication. In step 415, the POS terminal 100 receives an enrollment token, created by the enrollment process, authenticates the token which provides information that identifies the portable computing device 200 and the owner of the portable computing device 200. In some embodiments, the POS terminal 100 sends a token to the portable computing device 200 and an application installed during the enrollment process authenticates the POS terminal 100 using the received token. In step 420, because the authentication process was successful, a connection is established between the portable computing device 200 and the POS terminal 100. Application software installed in the enrollment process communicates with the POS terminal 100 over the connection and places an icon or an alert on the display 225 of the portable computing device 200 that shows or indicates that the portable computing device 200 has established a wireless connection to the POS terminal 100.

In step 425, the customer selects the icon on the display 225 which causes the application software on the portable computing device 200 to display options on the display 225. The customer selects an option that causes the application software to send a request over the wireless connection to the POS terminal 100. The application software requests that the POS terminal 100 send all customer information, for the current transaction, that either has been and will be displayed on the customer display 120 to the portable computing device 200. The application software will display the received customer information on the display 255 of the portable computing device 200. In step 430, the POS terminal 100, determines that the portable computing device 200 has made a request to receive and display customer information for the current transaction. The POS terminal 100 sends the portable computing device 200 a copy of all the customer information that has been generated up to this point in the transaction, and the enrollment application software running on the portable computing device 200 stores and displays the customer information on the display 255.

In step 435, the POS terminal 100 continues processing the current transaction. The POS terminal 100 sends the portable computing device 200 a copy of the standard customer information for display in real-time for each item that is processed by the POS terminal 100. In addition, when the portable computing device 200 is used to display customer information, the POS terminal 100 generates additional customer information for one or more of the items presented for purchase. The additional customer information is only displayed and stored on the portable computing device 200. Any additional customer information for items already processes for the current transaction, will be included in the historical customer information that is initially sent to the portable computing device 200 when the display function is transferred to the portable computing device 200. The customer display 120 may continue to display the standard customer information only. However, in some embodiments, the customer display 120 of the POS terminal 100 is turned off when the portable computing device 200 is being used to display the customer information.

The additional customer information is only sent to the portable computing device 200 and is not displayed on customer display 120 of the POS terminal 100, even if the customer display 120 is on and displaying the standard customer information. The additional customer information includes detailed information about the item being purchased and/or the transaction. The detailed information can include calorie data, allergy information and an URL to a web site having information about the item, including recipes. The additional customer information can include loyalty program information in more detail than is found in the standard customer information. The additional information can include ads, specials and coupons usable with the current purchase or for a future purchase.

In step 440, the portable computing device 200 maintains and manages the storage of coupons, ads and specials (collectively "coupons"). The coupons can be received from the POS terminal 100 (or any similar terminal) during a previous transaction or received from other sources such as store servers, web sites, email or they can be manually entered. The coupons include both store and manufacturers discounts. The coupons are valid for a specific time period and the portable computing device 200 will manage the coupons based on their individual valid time period. Coupons that have expired will be discarded and coupons that have not reached their start date will not be used.

Continuing with step 440, when the portable computing device 200 receives customer information detailing an item presented to the POS terminal 100 for purchase, the portable computing device 200 determines if the item is covered by one or more coupons managed by the portable computing device 200. If the item matches a product covered by one or more of the coupons, the portable computing device 200 notifies the customer and sends the one or more coupons to the POS terminal 100 over the connection. The POS terminal 100 then applies the proper credit to the item based on the coupon and provides details of the credit back to the customer. If the coupon could only be used once, the portable computing device 200 discards the coupon.

In step 445, after all items have been scanned and/or identified, the POS terminal 100 sends a total cost of the items and request for payment to the portable computing device 200. The information is displayed on the portable computing device 200 and the customer selects the method of payment which is communicated back to the POS terminal 100. Methods of payment include payment by credit or debit card, electronic check, paper check or currency. For currency or paper check, the customer presents the currency or paper check to operator of the POS terminal 100. For electronic check, the data necessary to process an electronic check is sent to the POS terminal 100 from the portable computing device 200. For credit or debit cards, the customer selects to have the necessary data sent electronically from the portable computing device 200 or the customer can physically swipe a credit or debit card using the MSR/PIN PAD device 140 of the POS terminal 100. In some embodiments, the portable computing device 200 processes the credit or debit transaction independent of the POS terminal 100 and provides the POS terminal 100 with confirmation once the payment is complete.

In step 450, the POS terminal 100 signals the portable computing device 200 when receipt of the payment is confirmed. This also signals the end of the transaction so the portable computing device 200 saves all transaction information and displays a notice to the customer that the transaction is complete. In some embodiments, the customer selects not to receive a paper receipt and the POS terminal 100 is instructed not to print a paper receipt. The option to print a paper receipt can be a customer selected option stored in the portable computing device 200 and sent to the POS terminal 100 automatically when the connection is made or it can be a request sent by the POS terminal 100 and displayed on the portable computing device 200 so the customer can select the option.

It should be noted that the customer can at any time after the portable computing device 200 has taken over the function of displaying customer information, transfer the function of displaying customer information back to the POS terminal 100. If the display function is transferred back the POS terminal 100, all displays and functions of the POS terminal 100 will return to normal operation. The customer transfers the displaying of customer information back to the POS terminal 100 by selecting an option on the portable computing device 200 which causes a request to be sent to the POS terminal 100 to take back the customer display function. It should further be noted that an operator of the POS terminal 100 is not involved in the transfer of the customer display function to the portable computing device 200 or back to the POS terminal 100. The customer has complete control over transferring the displaying of the customer information to the portable computing device 200 and does not need to interact with the operator to do so. This provides the customer with complete flexibility to use their portable device 200 for a given transaction or not, or to change their mind during the transaction (transferring the "customer session" back or forth between the POS 100 and the portable computing device 200.

While the present invention is described in the context of an assisted point of sale terminal, the invention may also be implemented using a self-service point of sale terminal. In this environment, the portable computing device 200 performs the same functions as described above e.g., storing a detailed record of the transaction, providing payment information, providing coupons and receiving coupons for future use. However, the customer display on the self-service point of sale terminal remains active and is the primary method to communicate with the customer as the customer scans or identifies items in the transaction. The customer can still see the standard and additional customer information on the portable computing device 200 during or after the transaction is complete and a customer can still select to not receive a printed receipt.

The present invention may also be implemented in other self-service applications such as a self-service kiosk, DVD rental kiosk, or similar devices. In these situations, a portion of the interaction (e.g. payment, transaction receipt, additional valuable information) between the customer and the self-service device would be transferrable to the customer's portable computing device 200.

Although particular reference has been made to a point of sale terminal, certain other embodiments, variations and modifications are also envisioned within the spirit and scope of the following claims.

I claim:

1. In a point of sale terminal, a computer implemented method for communicating with a customer using a portable computing device, the method implemented as executable instructions residing in a non-transitory computer-readable storage medium for execution on the point of sale terminal, the method comprising:

starting, on the point of sale terminal, a purchase transaction for the customer where one or more items are presented to the point of sale terminal for identification and purchase;

determining, the point of sale terminal, the presence of the portable computing device;

establishing, by the point of sale terminal, wireless communications with the portable computing device, wherein establishing further includes establishing the wireless communications as a customer session for the purchase transaction between the point of sale terminal and the portable computing device;

receiving, by the point of sale terminal and from the portable computing device a token that identifies the portable computing device and the customer;

authenticating, by the point of sale terminal, the token and the identity of the portable computing device and the customer;

receiving, by the point of sale terminal and from the portable computing device a request, initiated by the customer, to transmit transaction information being displayed on a customer display of the point of sale terminal to the portable computing device where the transaction information includes information that identifies each item presented for purchase;

transferring, by the point of sale terminal, complete electronic control of where the transaction information is being displayed during the customer session to the portable computing device and dynamically switching back and forth between displaying that transaction information on the portable computing device and the point of sale terminal in response to selectable options presented on the portable computing device being activated on the portable computing device during the customer session; and transmitting, by the point of sale terminal and in response to the request, the transaction information being displayed on the customer display and additional information about the transaction that is not part of the transaction information displayed on the customer display where the information is transmitted in real-time as the one or more items are presented for purchase.

2. The method of claim 1, further comprising:

receiving an electronic coupon for one of the one or more items presented for purchase from the portable computing device;

adjusting the price of the item using information from the received electronic coupon; and transmitting the updated transaction information for the item to the portable computing device.

3. The method of claim I further comprising:

transmitting a total price of all presented items to the portable computing device; and receiving from the portable computing device payment information for the total price of the presented items.

4. The method of claim 3, wherein the payment information includes information to confirm that a payment for the total price has been made by the portable computing device without involving the point of sale terminal.

5. The method of claim 3, wherein the payment information includes information used by the point of sale terminal to complete the payment without requiring additional input from the customer.

6. The method of claim 5, wherein the payment information includes credit card information.

7. The method of claim 5, wherein the payment information includes debit card and. PIN information.

8. The method of claim 1, wherein transmitting the transacting information further includes where the point of sale terminal provides only an electronic receipt for the purchase transaction.

9. The method of claim 1, further comprising:

receiving from the portable computing device a second request, initiated by the customer, to stop transmitting transaction information to the portable computing device; and displaying, in response to the second request, the transaction information on the customer display of the point of sale terminal and stopping the transmitted of transaction information to the portable computing device.

10. The method of claim 1, wherein the point of sale terminal is an operator assisted terminal.

11. A point of sale terminal for conducting a transaction where items are presented to the terminal by a customer for purchase and a payment is received for the purchased items, the terminal comprising:

a scanner and scale configured to identify and the items presented for purchase;

an operator display configured to display operator related information;

a customer display configured to display standard transaction information to the customer;

a magnetic stripe reader and PIN pad;

a cash drawer;

a network controller;

a wireless transceiver configured to wirelessly communicate with a portable computing device where the device is operated by a customer conducting the transaction at the point of sale terminal; and a computer configured to execute code from a non-transitory computer -readable medium to control the point of sale terminal and the components attached to it and where executing the code causes the point to sale terminal to perform a plurality of functions, the functions comprising:

starting a purchase transaction on the point of sale terminal for the customer where one or more items are presented to the point of sale terminal for identification and purchase;

determining the presence of a portable computing device;

establishing wireless communications with the portable computing device, wherein establishing further includes establishing the wireless communications as a customer session for the purchase transaction between the point of sale terminal and the portable computing device;

receiving from the portable computing device a token that identifies the portable computing device and the customer;

authenticating the token and the identity of the portable computing device and the customer;

receiving from the portable computing device a request, initiated by the customer, to transmit transaction information being displayed on a customer display of the point of sale terminal to the portable computing device where the transaction information includes information that identifies each item presented for purchase;

transferring, by the point of sale terminal, complete control of where and how the transaction information is presented during the customer session to the portable computing device and dynamically switching back and forth between displaying that transaction information on the portable computing device and the point of sale terminal in response to selectable options presented on the portable computing device being activated on the portable computing device during the customer session; and transmitting, in response to the request, the transaction information being displayed on the customer display and additional information about the transaction that is not part of the transaction information displayed on the customer display where the information is transmitted in real-time as the one or more items arc presented for purchase.

12. The terminal of claim 11, wherein the functions further include:

receiving an electronic coupon for one of the one or more items presented for purchase from the portable computing device;

adjusting the price of the item using information from the received electronic coupon; and transmitting the updated transaction information for the item to the portable computing device.

13. The terminal of claim 11, wherein the functions further include:

transmitting a total price of all presented items to the portable computing device; and
receiving from the portable computing device payment information for the total price of the presented items.

14. The terminal of claim 13, wherein the payment information includes information to confirm that payment has been made.

15. The terminal of claim 13, wherein the payment information includes information for the point of sale terminal to complete the payment without requiring additional input from the customer.

16. The terminal of claim 15, wherein the payment information includes credit or debit card information.

17. The terminal of claim 11, wherein transmitting the transacting information further includes where the point of sale terminal provides only an electronic receipt for the purchase transaction.

18. The terminal of claim 11, wherein the functions further include:
receiving from the portable computing device a second request, initiated by the customer, to stop transmitting transaction information to the portable computing device; and
displaying, in response to the second request, the transaction information on the customer display of the point of sale terminal and stopping the transmitted of transaction information to the portable computing device.

19. The terminal of claim 11, wherein the point of sale terminal is an operator assisted terminal.

20. In a point of sale system, a computer implemented method for a point of sale terminal to communicate transaction information to a customer using a portable computing device, the method implemented as executable instructions residing in a non-transitory computer-readable storage medium for execution on the point of sale terminal, the method comprising:
starting, on the point of sale terminal, a purchase transaction for the customer where one or more items are presented to the point of sale terminal for identification and purchase;
determining by the point of sale terminal the presence of the portable computing device;
establishing, by the point of sale terminal, wireless communications between the point of sale terminal and the portable computing device, wherein establishing further includes establishing the wireless communications as a customer session for the purchase transaction between the point of sale terminal and the portable computing device;
receiving, by the point of sale terminal and from the portable computing device a token that identifies the portable computing device and the customer;
authenticating, by the point of sale terminal the token and the identity of the portable computing device and the customer by the point of sale terminal;
receiving, by the point of sale terminal and from the portable computing device a request, initiated by the customer, to transmit transaction information being displayed on a customer display of the point of sale terminal to the portable computing device where the transaction information includes information that identifies each item presented for purchase;
transferring, by the point of sale terminal, complete electronic control of where and how the transaction information is presented during the customer session to the portable computing device and dynamically switching back and forth between displaying that transaction information on the portable computing device and the point of sale terminal in response to selectable options presented on the portable computing device being activated on the portable computing device during the customer session; and
transmitting, by the point of sale terminal in response to the request, the transaction information being displayed on the customer display and additional information about the transaction that is not part of the transaction information displayed on the customer display where the information is transmitted in real-time as items are presented for purchase.

21. The method of claim 20, further comprising:
displaying, after establishing wireless communications, an alert on the portable computing device signaling it is connected to the point of sale terminal.

22. The method of claim 20, further comprising saving in the portable computing device the transaction information received from the point of sale terminal.

23. The method of claim 20, further comprising:
storing one or more electronic coupons by the portable computing device; and determining, by the portable computing device, that an item scanned by the point of sale terminal matches a stored electronic coupon and sending the stored electronic coupon to the point of sale terminal.

24. The method of claim 23, further comprising:
receiving an electronic coupon by the point of sale terminal;
adjusting, by the point of sale terminal, the price of the item using information from the received electronic coupon; and
transmitting the updated transaction information for the item to the portable computing device.

25. The method of claim 20, further comprising:
transmitting a total price of all presented items to the portable computing device; and
receiving from the portable computing device payment information.

26. The method of claim 25, wherein the payment information includes information to confirm that a payment for the total price has been made.

27. The method of claim 25, wherein the payment information includes information for the point of sale terminal to complete a payment without requiring additional input from the customer.

28. The method of claim 20, wherein transmitting the transacting information further includes where the point of sale terminal provides only an electronic receipt for the purchase transaction.

* * * * *